(12) United States Patent
Jung et al.

(10) Patent No.: US 8,396,627 B2
(45) Date of Patent: Mar. 12, 2013

(54) METHOD FOR OPERATING A VEHICLE

(75) Inventors: Andreas Jung, Leiden (NL); Rainer Marstaller, Ingolstadt (DE); Andreas Mayer, Freiburg (DE)

(73) Assignee: Continental Automotive GmbH, Hannover (DE)

( * ) Notice: Subject to any disclaimer, the term of this patent is extended or adjusted under 35 U.S.C. 154(b) by 840 days.

(21) Appl. No.: 12/442,630

(22) PCT Filed: May 29, 2007

(86) PCT No.: PCT/EP2007/055162
§ 371 (c)(1),
(2), (4) Date: Sep. 23, 2009

(87) PCT Pub. No.: WO2008/037509
PCT Pub. Date: Apr. 3, 2008

(65) Prior Publication Data
US 2010/0036561 A1    Feb. 11, 2010

(30) Foreign Application Priority Data
Sep. 26, 2006   (DE) .......................... 10 2006 045 305

(51) Int. Cl.
*B60W 40/12* (2006.01)
*B60W 40/10* (2006.01)
(52) U.S. Cl. .......................................... 701/37; 701/124
(58) Field of Classification Search .................. None
See application file for complete search history.

(56) References Cited

U.S. PATENT DOCUMENTS

| | | | |
|---|---|---|---|
| 4,948,164 A | 8/1990 | Hano et al. | 280/707 |
| 5,287,277 A * | 2/1994 | Mine et al. | 701/37 |
| 5,342,079 A | 8/1994 | Buma | 280/707 |
| 5,500,798 A | 3/1996 | Inagaki | 364/424.05 |
| 6,055,471 A | 4/2000 | Ohsaku et al. | 701/37 |
| 6,173,226 B1 | 1/2001 | Yoshida et al. | 701/51 |
| 6,314,383 B1 | 11/2001 | Leimbach et al. | 702/173 |

(Continued)

FOREIGN PATENT DOCUMENTS

| | | |
|---|---|---|
| DE | 19728867 A1 | 1/1999 |
| DE | 10148091 A1 | 4/2003 |

(Continued)

OTHER PUBLICATIONS

International PCT Search Report, PCT/EP2007/055162, 6 pages, mailed Oct. 26, 2007.

(Continued)

*Primary Examiner* — Michael J. Zanelli
(74) *Attorney, Agent, or Firm* — King & Spalding L.L.P.

(57) ABSTRACT

In a method for operating a vehicle with wheel suspensions which each have a characteristic curve, the characteristic curve generates a relation between the weight of the vehicle, applied to each wheel suspension, and the respective height of the vehicle at the wheel suspension point. At least two height sensors detect the height at the wheel suspensions, a reference height is associated with the height sensors and represents a pre-defined loading state of the vehicle. The method provides: detecting the height, determining the forces applied to the vehicle, determining the acceleration of the vehicle on the basis of the forces applied to the vehicle, determining an estimated value for the mass of the vehicle from the forces and the acceleration of the vehicle, and determining values representing the reference heights from at least the estimated value for the mass of the vehicle, the characteristic curves of the wheel suspensions, and the detected heights.

20 Claims, 2 Drawing Sheets

U.S. PATENT DOCUMENTS

| | | | |
|---|---|---|---|
| 7,363,116 B2 | 4/2008 | Flechtner et al. | 701/1 |
| 2003/0236603 A1 | 12/2003 | Lu | 701/37 |
| 2004/0181317 A1 | 9/2004 | Flechtner et al. | 701/1 |
| 2005/0273241 A1* | 12/2005 | Tsukasaki et al. | 701/70 |

FOREIGN PATENT DOCUMENTS

| | | | |
|---|---|---|---|
| DE | 10337212 A1 | 3/2005 | |
| EP | 0326180 A2 | 8/1989 | |
| EP | 0563845 A1 | 10/1993 | |
| EP | 0645265 A1 | 3/1995 | |

OTHER PUBLICATIONS

German Office Action, German application No. 10 2006 045 305.0-51, 4 pages, Feb. 28, 2007.

* cited by examiner

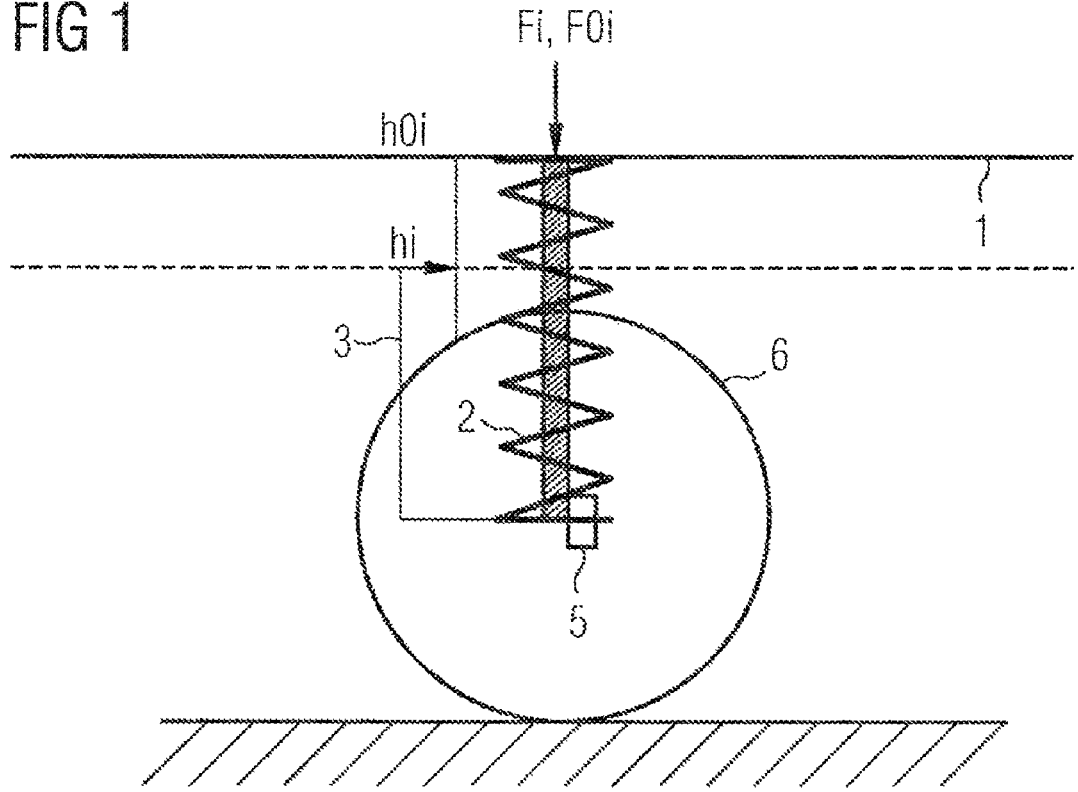
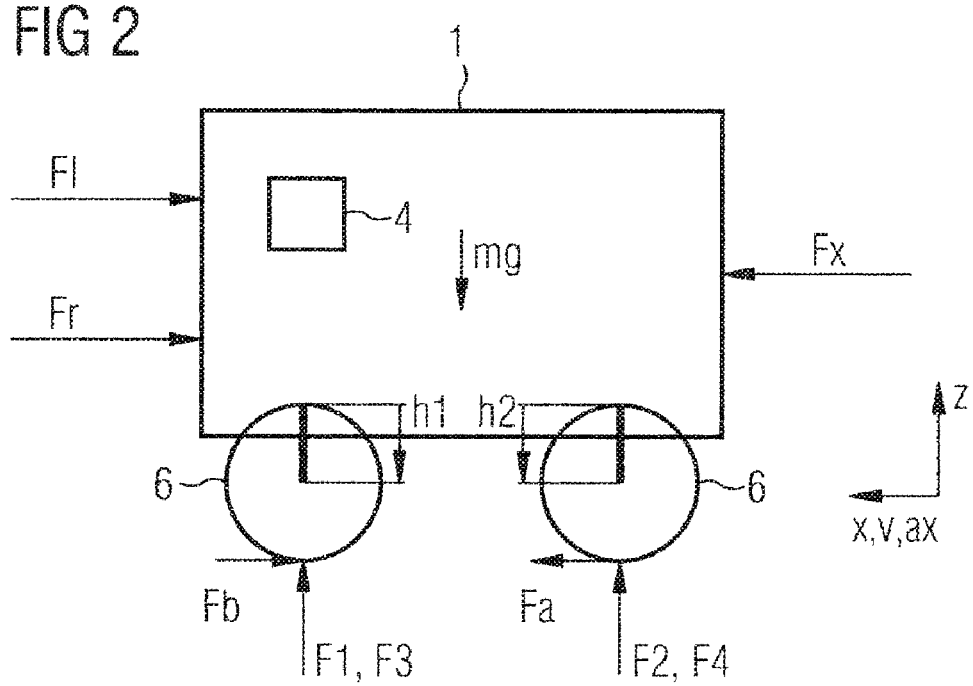

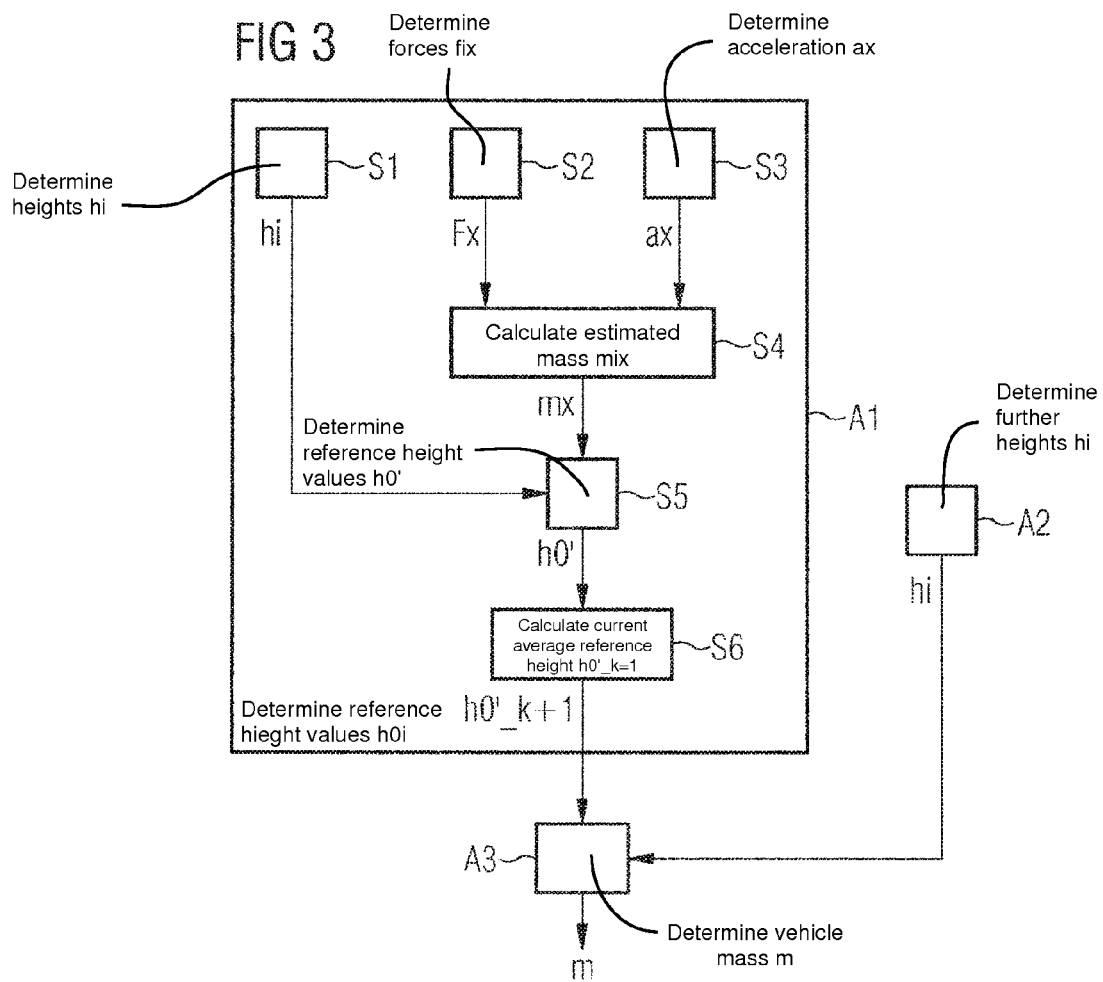
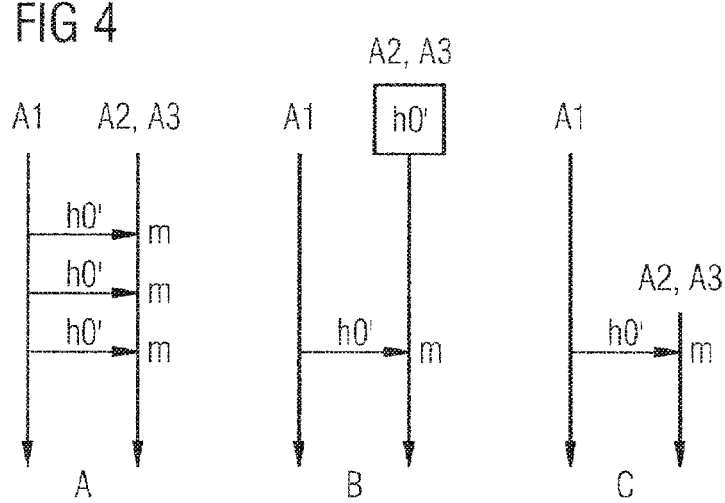

METHOD FOR OPERATING A VEHICLE

CROSS-REFERENCE TO RELATED APPLICATIONS

This application is a U.S. National Stage Application of International Application No. PCT/EP2007/055162 filed May 29, 2007, which designates the United States of America, and claims priority to German Application No. 10 2006 045 305.0 filed Sep. 26, 2006, the contents of which are hereby incorporated by reference in their entirety.

TECHNICAL FIELD

The invention relates to a method for operating a vehicle, in particular for determining the mass of a vehicle.

BACKGROUND

The knowledge of the mass may be used to identify loading states and to parameterize braking systems or tire pressure controls according to the load.

SUMMARY

According to various embodiments, a method and a device for operating a vehicle can be specified in which the mass of the vehicle may be rapidly and accurately determined.

In one embodiment, a method is provided for operating a vehicle which comprises wheel suspensions and characteristic curves respectively associated therewith, each characteristic curve respectively generating a relation between the weight of the vehicle proportionally applied to a respective wheel suspension and a respective height of the vehicle at a wheel suspension point, and at least two height sensors for detecting heights at the wheel suspensions, the method comprising the steps of: detecting the heights, determining forces applied to the vehicle, determining an acceleration of the vehicle due to the forces applied to the vehicle, determining an estimated value of the mass of the vehicle from the determined forces applied to the vehicle and the determined acceleration of the vehicle, and determining values which represent one or more reference heights from at least one determined estimated value of the mass of the vehicle, the characteristic curves of the wheel suspensions, and the detected heights, the one or more reference heights representing a pre-defined loading state of the vehicle.

In a further embodiment, the method further comprises: detecting further heights, and determining the mass of the vehicle, according to at least the values which represent the reference heights, the characteristic curves of the wheel suspensions and the further heights.

In a further embodiment, the method further comprises averaging the values which represent the reference heights.

In a further embodiment, at least the drive force, the braking force, the drag or the rolling resistance of the vehicle are taken into account for determining the force applied to the vehicle.

In a further embodiment, longitudinal acceleration is detected as acceleration of the vehicle by means of a longitudinal acceleration sensor.

In a further embodiment, a wheel velocity is detected via at least one wheel velocity sensor, and the acceleration of the vehicle is determined from the time derivative of the detected wheel velocity.

In a further embodiment, the estimated value of the mass in pre-defined vehicle situations is detected.

In a further embodiment, an average estimated value of the mass is determined according to the estimated values of the mass.

In a further embodiment, (a) the determination of the estimated value of the mass of the vehicle from the forces applied to the vehicle and the acceleration of the vehicle, (b) the determination of the values which represent the reference heights and (c) the determination of the mass of the vehicle are carried out in a quasi parallel manner from the values which represent the reference heights, the detected heights, and the characteristic curves of the wheel suspensions.

In a further embodiment, as soon as the values which represent the reference heights have been determined, said values are used for determining the mass of the vehicle.

In a further embodiment, the values which represent the reference heights are only determined when the estimated value of the mass of the vehicle is in a pre-defined value range.

In a further embodiment, the values which represent the reference heights are only used for determining the mass of the vehicle after these values have been altered by a pre-defined value.

In a further embodiment, for determining the values which represent the reference heights, at least one Kalman filter is used in which already determined values together with values just detected are linked for determining new values.

In a further embodiment, the characteristic curves of the wheel suspensions are determined according to the differences in height and differences in mass of the vehicle.

In a further embodiment, braking systems or tire air pressures are set according to the determined mass of the vehicle.

In another embodiment, a device is provided for operating a vehicle comprising wheel suspensions and characteristic curves respectively associated therewith, each characteristic curves respectively generating a relation between the weight of the vehicle proportionally applied to a respective wheel suspension and a respective height of the vehicle at a wheel suspension point, and at least two height sensors for detecting heights at the wheel suspensions, the device being configured: to detect the heights, to determine forces applied to the vehicle, to determine an acceleration of the vehicle due to the forces applied to the vehicle, to determine an estimated value of the mass of the vehicle from the determined forces applied to the vehicle and the determined acceleration of the vehicle, and to determine values which represent one or more reference heights from at least one determined estimated value of the mass of the vehicle, the characteristic curves of the wheel suspensions, and the detected heights, the one or more reference heights representing a pre-defined loading state of the vehicle.

In a further embodiment, the device is further configured to detect further heights, and determine the mass of the vehicle, according to at least the values which represent the reference heights, the characteristic curves of the wheel suspensions and the further heights.

In a further embodiment, the device is further configured to average the values which represent the reference heights.

In a further embodiment, the device is further configured to take into account at least the drive force, the braking force, the drag or the rolling resistance of the vehicle for determining the force applied to the vehicle.

In a further embodiment, the device comprises a longitudinal acceleration sensor configured to detect longitudinal acceleration as acceleration of the vehicle.

BRIEF DESCRIPTION OF THE DRAWINGS

Exemplary embodiments of the invention are described below with reference to the schematic figures, in which:

FIG. 1 shows an exemplary embodiment of a wheel suspension with a height sensor, FIG. 2 shows an exemplary vehicle with the forces applied to the vehicle and accelerations, FIG. 3 shows an exemplary flow diagram with steps for determining the mass of the vehicle, and FIG. 4 shows exemplary embodiments in which the determined reference heights are processed at different time points.

DETAILED DESCRIPTION

The vehicle comprises wheel suspensions and characteristic curves respectively associated therewith, the characteristic curves respectively generating a relation between the weight of the vehicle proportionally applied to the respective wheel suspension and the respective height of the vehicle at the wheel suspension point. The vehicle, moreover, has at least two height sensors for detecting the heights at the wheel suspensions, one respective reference height, representing a pre-defined loading state of the vehicle, being associated with the height sensors. According to various embodiments, in a method and a corresponding device, the heights are detected and the forces applied to the vehicle and the acceleration of the vehicle due to the forces applied to the vehicle are determined. An estimated value of the mass of the vehicle is determined from the forces applied to the vehicle and the acceleration of the vehicle. Values representing reference heights are determined from at least the estimated value of the mass of the vehicle, the characteristic curves of the wheel suspensions and the detected heights.

Thus two or more height sensors are used for determining the mass. Such height sensors or spring path sensors are found, for example, in vehicles with level control or active suspension. Together with the characteristic curves of the wheel suspension which, for example, are described by spring constants, the weight proportionally applied to the wheel suspensions may be determined from the heights and conclusions drawn therefrom about the mass of the vehicle. Height sensors enable relative mass alterations to be detected with great precision within very short times, both when the vehicle is stationary and during travel. A difficulty in this case is that the height sensors should be regularly calibrated in order to avoid faulty results during long-term use, due to alterations in the wheel suspensions or the vehicle body.

To this end, an estimated value of the mass of the vehicle is determined from the forces applied to the vehicle and the acceleration of the vehicle. The estimated value of the mass of the vehicle is preferably provided by the quotient of the forces applied to the vehicle and the acceleration of the vehicle produced by these forces. This estimated value is used together with the characteristic curves of the wheel suspensions in order to determine values which represent the reference heights of the height sensors, and thus preferably to calibrate the height sensors. In this manner, the high accuracy and the short measuring time of the height sensors may be utilized and thus also a calibration process may be carried out.

In a further embodiment, further heights are detected and the mass of the vehicle determined according to at least the values which represent the reference heights, the characteristic curves of the wheel suspensions and the further heights.

Thus the mass of the vehicle may also be determined.

In a further embodiment, the values which represent the reference heights are averaged.

By averaging the values which represent the reference heights, outliers of the estimated values of the mass are compared. Outliers of the estimated values of the mass may, for example, arise as a result of unsuitable driving situations when determining the forces applied to the vehicle or the acceleration of the vehicle.

In a further embodiment, at least the drive force, the braking force, the drag or the rolling resistance of the vehicle are taken into account for determining the forces applied to the vehicle.

The drag and rolling resistance form part of the essential forces which act on the vehicle. By taking into account only the most important forces, the complexity of determining the forces may be reduced. Preferably, other forces which are produced, for example, by the moment of inertia of the tires, may also be taken into account. The forces applied to the vehicle may be directly measured or calculated by measurements which are fed into a model.

In a further development, longitudinal acceleration is detected as acceleration of the vehicle by means of a longitudinal acceleration sensor.

Longitudinal acceleration sensors are available as standard sensors and allow simple and accurate measurement of the acceleration of the vehicle in the longitudinal direction.

In a further embodiment, via at least one wheel velocity sensor a wheel velocity is detected and the acceleration of the vehicle determined from the time derivative of the detected wheel velocity.

Wheel velocity sensors are already present in many vehicles, for example as part of an anti-lock braking system and may be used without great additional cost, in order to determine the acceleration of the vehicle.

In a further embodiment, the estimated value of the mass is determined in pre-defined driving situations.

By a suitable selection of driving situations, errors in the calculation of the estimated value of the mass of the vehicle may be minimized and correction terms and averaging methods with a high computational complexity may be avoided. An advantageous driving situation is, for example, travel on a straight route without gradient and with uniform acceleration in a low velocity range.

In a further embodiment, an average estimated value of the mass may be determined according to the estimated values of the mass.

As fluctuations may occur in the estimated value of the mass, depending on the driving situations, it is advantageous if the estimated values of the mass are averaged.

In a further embodiment, the determination of the estimated value of the mass of the vehicle from the forces applied to the vehicle and the acceleration of the vehicle, the determination of the values which represent the reference heights and the determination of the mass of the vehicle are carried out in a quasi parallel manner from the values which represent the reference heights, the measured heights and the characteristic curves of the wheel suspensions.

In this manner, an estimated value of the mass of the vehicle may be used immediately for calculating the reference heights and thus without delay for determining the mass of the vehicle.

In a further embodiment, as soon as the values which represent the reference heights have been determined, said values are used for determining the mass of the vehicle.

In this manner, recently detected reference heights, where there are changes to the vehicle mass, are available immediately for determining the mass of the vehicle, so that a decalibration of the height sensors is avoided where there are changes to the mass, which are due, for example, to the vehicle body.

In a further embodiment, the values which represent the reference heights are only determined when the estimated value of the mass of the vehicle is in a pre-defined value range.

In this manner, it may be ensured that the reference heights do not adopt inadmissible values. The pre-defined value range may, for example, be determined by the empty weight and the maximum admissible weight of the vehicle.

In a further embodiment, the values which represent the reference heights are only used for determining the mass of the vehicle after these values have been altered by a pre-defined value.

If the values which represent the reference heights are only slightly altered, it is not necessary that said values are continually updated and used for determining the mass of the vehicle. In this manner unnecessary computational operations are avoided.

In a further embodiment, for determining the values which represent the reference heights, at least one Kalman filter is used in which already determined values together with the values just detected are linked for determining further values of the reference heights.

The advantage of the Kalman filter in this connection is that it has an iterative structure and is thus suitable for real-time applications. In this case the new values form an estimated value of the reference heights.

In a further embodiment, the characteristic curves of the wheel suspensions are determined from the differences in height and the differences in the mass of the vehicle. As the characteristic curves of the wheel suspensions may alter or may be unknown, it is advantageous to determine said characteristic curves from at least two heights, which belong to two different masses of the vehicle. The determination also includes an adaptation of the characteristic curves, whereby automatic calibration is possible.

In a further embodiment, braking systems or tire pressure information systems are set according to the determined mass of the vehicle.

In particular, in vehicles of which the mass is subject to considerable fluctuations, such as for example in heavy goods vehicles or vans, the braking systems, such as for example the anti-lock braking system (ABS), electronic stability program (ESP) and drive slip control (ASR) as well as the tire pressure information systems are adapted to the detected mass of the vehicle, which results in an increase in safety.

FIG. 1 shows a part of a vehicle 1 to which a wheel 6 of the vehicle is fastened by means of a wheel suspension 2. Depending on the force Fi acting on the wheel suspension 2, a height hi may be detected via a height sensor 3. A reference height h0$i$ thus represents a pre-defined loading state of the vehicle, for example an unloaded state. If the loading state of the vehicle 1 is altered, the height hi is also altered, the relation between the height hi and the force Fi applied to the wheel suspension 2 being provided by the characteristic curve Di of the wheel suspension 2.

The wheel suspension 2 may, for example, be implemented as a spring damping system with a spiral spring, leaf spring or a gas pressure spring. For spring damping systems and normal loading states, the characteristic curve Di of the wheel suspension 2 may be assumed to be approximately linear, so that Hook's Law applies. For gas pressure spring systems, the characteristic curve Di may be obtained from the operating range according to the characteristic path of the gas pressure spring system. In Hook's Law in a pre-defined loading state of the vehicle, which for example is an unloaded state of the vehicle, the weight of the vehicle F0$i$ proportionally applied to the ith wheel suspension, is the product of the characteristic curve Di of the ith wheel suspension 2 and the reference height h0$i$ of the ith height sensor 3:

$$F0i = Di * h0i. \tag{G1}$$

In a further pre-defined loading state of the vehicle which for example is characterized by a useful load, the proportional force Fi acts on the ith wheel suspension 2 and the height hi is included, the following applying:

$$Fi = Di * hi. \tag{G2}$$

In FIG. 1 only one wheel suspension 2 and one height sensor 3 are shown. The vehicle 1, however, generally has a plurality N of wheel suspensions 2 and height sensors 3. One respective height sensor 3 may be associated with each wheel suspension 2. A height sensor 3 may, however, also be associated with two wheel suspensions 2, for example, which belong to an axle of the vehicle.

In FIG. 2, a vehicle 1 is shown together with the forces applied thereto. The equilibrium of forces in the vertical z-direction requires that the weight of the vehicle 1 is the same as the sum of the forces Fi applied to the individual wheel suspensions 2. According to the equations (G1) and (G2) this is again equal to the sum of the products of the respective characteristic curves Di and the heights hi. The following applies:

$$\Sigma Fi = m*g = \Sigma(Di*hi) \tag{G3}$$

in the loaded state and $$\Sigma F0i = m0*g = \Sigma(Di*h0i) \tag{G4}$$

in the unloaded state, g being the force of gravity. If the vehicle 1 has, for example, four wheels 6 and four height sensors 3, the sums are calculated where i=1, 2, 3, 4. When taking into account the individual wheel heights hi, the static wheel loads may be determined by an averaging method. In this manner it is possible both when stationary and also when traveling to identify load displacements and to provide corresponding warning signals to other control devices, such as the electronic stability program or a braking system.

Height differences are preferably read from the height sensors 3. If the equations (G3) and (G4) are subtracted from one another for the total forces of the loaded and unloaded states, the following results:

$$\Sigma(Di*hi) - \Sigma(Di*h0i) = (m - m0)*g. \tag{G5}$$

By rearranging this equation, the mass m of the vehicle may be calculated if the characteristic curves Di, the heights hi, the reference heights h0$i$, the mass of the unloaded vehicle m0 and the force of gravity g are known:

$$m = m0 + (\Sigma(Di*hi) - \Sigma(Di*h0i))/g. \tag{G6}$$

In reverse, values which represent the reference heights h0$i$ may be calculated from $$\Sigma(Di*h0i) = \Sigma(Di*hi) - (m - m0)*g. \tag{G7}$$

A drawback with the calculation of the mass m is that the reference heights h0$i$ may alter or may be unknown. Thus an estimated value mx of the mass of the vehicle is determined, by means of which values which represent the reference height h0$i$ may be determined from the equation (G7).

For calculating the estimated value mx of the mass of the vehicle, the forces applied to the vehicle 1 shown in FIG. 2 in the x-direction are considered. The equilibrium of forces requires that the sum of these forces Fx equals the force of inertia:

$$Fx = mx*ax, \tag{G8}$$

ax being the acceleration of the vehicle in the x-direction. The forces applied to the vehicle in FIG. 2 in the x-direction are the drive force Fa and the drag F1 opposing said drive force $$F1 = cw*A*\rho/2*v^2 \tag{G9}$$

and the rolling resistance Fr $$Fr = cr*v \tag{G10}$$

cw being the coefficient of drag, A the projected front face of the vehicle, ρ being the air density, v the velocity of the vehicle 1 and cr the rolling resistance coefficient. From the equation (G8) an estimated value of the mass mx of the vehicle may be calculated:

$$mx=(Fa-Fr-Fl)/ax. \tag{G11}$$

The drive force Fa may in this case also be replaced by a braking force Fb or by a weight acting in the traveling direction. Naturally, the model shown in FIG. 2 of the vehicle 1 with regard to the forces applied may be further extended, for example, by the planar moment of inertia of the wheels or of the drive train being considered.

In order to be able to determine the estimated value mx of the mass of the vehicle 1 according to the equation (G11), in addition to the forces Fx applied it is also necessary to determine the acceleration ax of the vehicle 1. One possibility is to fix a longitudinal acceleration sensor 4, as shown in FIG. 2, to the vehicle 1, by which the acceleration ax is determined. The acceleration detected by this longitudinal acceleration sensor 4 does not have to be corrected according to the gradient, as the effective longitudinal acceleration which is output from this acceleration sensor, correlates to the vehicle mass irrespective of the gradient according to (G11). A further possibility is to use a wheel velocity sensor 5 shown in FIG. 1 for detecting the wheel velocity of the wheel 6. The longitudinal acceleration ax may thus be calculated from the time derivative of the wheel velocities and the wheel radius. With the longitudinal acceleration ax and the total force Fx applied to the vehicle 1, an estimated value mx may thus be calculated for the mass of the vehicle 1.

When determining the acceleration ax and the force Fx, it is advantageous if said acceleration and force are determined by lengthy averaging and in suitable driving situations. The driving situations are preferably selected such that assumptions about the forces applied to the vehicle 1 are fulfilled in the best possible manner. In the equations (G9) and (G10) the coefficient of drag cw, for example, and the rolling resistance coefficient cr are actually only constant in a specific velocity range of the vehicle 1, so that when determining the acceleration ax and the force Fx preferably velocities are selected which are in this range.

With the estimated value mx, only values which represent the reference heights h0i may now be calculated using the equation (G7). The values which represent the reference heights h0i may then be used in the equation (G6), and when measuring further heights hi used for calculating the mass m of the vehicle 1.

If all wheel suspensions 2 have the same characteristic curves Di=D and the average value h0' of the reference heights h0i $$h0'=1/N*\Sigma h0i \tag{G12}$$

and the average value h' of the heights hi $$h'=1/N*\Sigma hi \tag{G13}$$

are inserted, the equation (G6) is simplified into $$m=m0+D/g*N*(h'-h0') \tag{G14}$$

and the equation (G7) into $$h0'=h'-(m0-mx)*g/(N*D). \tag{G15}$$

FIG. 3 shows an exemplary flow diagram for determining the mass of a vehicle. In a first program A1, values which represent the reference heights h0i are determined. In a second program A2, the further heights hi are determined. The mass is determined in a third program A3 from the results of the first program A1 and of the second program A2 according to the equation (G6) or (G14).

In the first program A1, in step S1 initially the heights hi are determined. In steps S2 and S3, the forces Fx applied to the vehicle 1 and/or the acceleration ax of the vehicle 1 are determined. In step S4, from these values an estimated value of the mass mx is calculated according to the equation (G8). In step S5 the heights hi further detected in step S1 are processed together with the estimated value mx for the mass of step S4 using the equation (G7) or (G15), in order to determine values which represent the reference heights h0i. The steps S1, S2 and S3 may in this case be carried out in parallel.

In step S6 an estimation method is used for the values which represent the reference heights h0i. For the sake of simplicity, the estimation method is explained using the equation (G15) for the average value of the reference heights h0'. Naturally, this estimation method may also be used for the values from the equation (G7). A current value h0'_k+1 for the average value of the reference height is in this case calculated from the sum of a previous value h0'_k and the product of a Kalman constant kh0 with the difference between a current detected value h0' and the previous value h0'_k:

$$h0'\_k+1=h0'\_k+kh0*(h0'-h0'\_k). \tag{G16}$$

The Kalman gain kh0 indicates how rapidly and/or slowly the estimated value is adapted to altered situations. The use of the Kalman filter allows a highly accurate estimation of the average value of the reference heights h0'_k+1 and permits automatic calibration of the height sensors 3.

FIG. 4 shows three different exemplary embodiments, in which the values which represent the reference heights h0i are processed at different times. In part A, the first program A1 and the second program A2 from FIG. 3 are processed in parallel. In this case, a continuous updating of the values, which represent the reference heights and are denoted in the figure by h0', takes place so that the mass of the vehicle using the third program A3 may be updated within short time periods. This method is advantageous if the mass m of the vehicle 1 is altered in short time intervals, as for example is the case with a taxi which within a relatively short time period may be loaded with one or with four people.

Part B shows an exemplary embodiment in which the third program A3 initially starts with stored values h0' which represent the reference heights. The mass calculation is thus very rapidly available via the programs A2 and A3. The first program A1 runs parallel therewith, but an updating of the values h0' which represent the reference heights only takes place when said reference heights are significantly different from the latest stored value and stable over a long period of time.

Part C shows an exemplary embodiment in which after restarting the vehicle, initially the first program A1 is started in order to detect the values which represent the reference heights h0'. When these values prove to be stable over a long period of time, the second program A2 and the third program A3 are started, which use the detected value as an initial value for the calculation of the mass. A drawback with this procedure is, however, that a longer time, for example 15 minutes, is necessary until the values which represent the reference heights are determined and an accurate determination of the mass is able to take place. This method is, however, advantageous if the characteristic curves Di of the wheel suspensions 2 have altered.

In a further exemplary embodiment, conclusions may be drawn from the characteristic curves Di of the wheel suspensions 2. Additionally, in different loading states of the vehicle 1, the pairs of values (m1, hi1) and (m2, hi2) are stored in a specific individual algorithm. The spring constant D of a characteristic curve Di which is assumed to be linear, is calculated according to the quotient of the difference in weight and the difference in height:

$$D = (m2 \cdot g - m1 \cdot g)/(hi2 - hi1) \tag{G17}$$

and preferably added to the hitherto used spring constants. If a sliding averaging is carried out over a time period of, for example, at least several hundred kilometers, a very reliable estimated value results for the rise in the characteristic curve Di. By a comparison of the determined characteristic curve Di at large, regular intervals, conclusions may thereby be drawn about an alteration to the characteristic curve Di. The above described method for detecting the mass may subsequently be carried out with characteristic curves Di which have been recently determined and possibly altered. By this method a completely automatic calibration may be carried out, which also results in reliable calculations of the mass after redesigning the chassis or alterations to the vehicle body.

The invention claimed is:

1. A method for operating a vehicle which comprises wheel suspensions and characteristic curves respectively associated therewith, each characteristic curves respectively generating a relation between the weight of the vehicle proportionally applied to a respective wheel suspension and a respective height of the vehicle at a wheel suspension point, and at least two height sensors for detecting heights at the wheel suspensions, the method comprising the steps of:
   detecting the heights,
   determining forces applied to the vehicle,
   determining an acceleration of the vehicle due to the forces applied to the vehicle,
   determining an estimated value of the mass of the vehicle from the determined forces applied to the vehicle and the determined acceleration of the vehicle, and
   determining values which represent one or more reference heights from at least one determined estimated value of the mass of the vehicle, the characteristic curves of the wheel suspensions, and the detected heights, the one or more reference heights representing a pre-defined loading state of the vehicle.

2. The method according to claim 1, comprising the steps of:
   detecting further heights, and
   determining the mass of the vehicle, according to at least the values which represent the reference heights, the characteristic curves of the wheel suspensions and the further heights.

3. The method according to claim 1, comprising the step of averaging the values which represent the reference heights.

4. The method according to claim 1, wherein at least the drive force, the braking force, the drag or the rolling resistance of the vehicle are taken into account for determining the force applied to the vehicle.

5. The method according to claim 1, wherein longitudinal acceleration is detected as acceleration of the vehicle by means of a longitudinal acceleration sensor.

6. The method according to claim 1, wherein via at least one wheel velocity sensor a wheel velocity is detected, and the acceleration of the vehicle is determined from the time derivative of the detected wheel velocity.

7. The method according to claim 1, wherein the estimated value of the mass in pre-defined vehicle situations is detected.

8. The method according to claim 1, wherein an average estimated value of the mass is determined according to the estimated values of the mass.

9. The method according to claim 1, wherein (a) the determination of the estimated value of the mass of the vehicle from the forces applied to the vehicle and the acceleration of the vehicle, (b) the determination of the values which represent the reference heights and (c) the determination of the mass of the vehicle are carried out in a quasi parallel manner from the values which represent the reference heights, the detected heights, and the characteristic curves of the wheel suspensions.

10. The method according to claim 9, wherein as soon as the values which represent the reference heights have been determined, said values are used for determining the mass of the vehicle.

11. The method according to claim 9, wherein the values which represent the reference heights are only determined when the estimated value of the mass of the vehicle is in a pre-defined value range.

12. The method according to claim 9, wherein the values which represent the reference heights are only used for determining the mass of the vehicle after these values have been altered by a pre-defined value.

13. The method according to claim 1, wherein for determining the values which represent the reference heights, at least one Kalman filter is used in which already determined values together with values just detected are linked for determining new values.

14. The method according to claim 1, wherein the characteristic curves of the wheel suspensions are determined according to the differences in height and differences in mass of the vehicle.

15. The method according to claim 1, wherein braking systems or tire air pressures are set according to the determined mass of the vehicle.

16. A device for operating a vehicle comprising wheel suspensions and characteristic curves respectively associated therewith, each characteristic curves respectively generating a relation between the weight of the vehicle proportionally applied to a respective wheel suspension and a respective height of the vehicle at a wheel suspension point, and at least two height sensors for detecting heights at the wheel suspensions, the device being configured:
   to detect the heights,
   to determine forces applied to the vehicle,
   to determine an acceleration of the vehicle due to the forces applied to the vehicle,
   to determine an estimated value of the mass of the vehicle from the determined forces applied to the vehicle and the determined acceleration of the vehicle, and
   to determine values which represent one or more reference heights from at least one determined estimated value of the mass of the vehicle, the characteristic curves of the wheel suspensions, and the detected heights, the one or more reference heights representing a pre-defined loading state of the vehicle.

17. The device according to claim 16, wherein the device is further configured to detect further heights, and determine the mass of the vehicle, according to at least the values which represent the reference heights, the characteristic curves of the wheel suspensions and the further heights.

18. The device according to claim 16, wherein the device is further configured to average the values which represent the reference heights.

19. The device according to claim 16, wherein the device is further configured to take into account at least the drive force, the braking force, the drag or the rolling resistance of the vehicle for determining the force applied to the vehicle.

20. The device according to claim 16, comprising a longitudinal acceleration sensor configured to detect longitudinal acceleration as acceleration of the vehicle.

* * * * *